(12) United States Patent
Deng et al.

(10) Patent No.: US 12,440,872 B2
(45) Date of Patent: Oct. 14, 2025

(54) METHODS OF CLEANING GLASS

(71) Applicant: CORNING INCORPORATED, Corning, NY (US)

(72) Inventors: Huayun Deng, Painted Post, NY (US); Deqiu Fan, Painted Post, NY (US); Mingqian He, Horseheads, NY (US); Weijun Niu, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 30 days.

(21) Appl. No.: 18/661,792

(22) Filed: May 13, 2024

(65) Prior Publication Data

US 2024/0383014 A1 Nov. 21, 2024

Related U.S. Application Data

(60) Provisional application No. 63/467,638, filed on May 19, 2023.

(51) Int. Cl.
*B08B 3/08* (2006.01)
*B08B 3/14* (2006.01)
*B08B 7/00* (2006.01)

(52) U.S. Cl.
CPC ............... *B08B 3/08* (2013.01); *B08B 3/14* (2013.01); *B08B 7/0071* (2013.01)

(58) Field of Classification Search
CPC ............ B08B 3/08; B08B 3/14; B08B 7/0071
See application file for complete search history.

(56) References Cited

U.S. PATENT DOCUMENTS

| | | |
|---|---|---|
| 5,676,760 A | 10/1997 | Aoki et al. |
| 5,725,678 A | 3/1998 | Cannon et al. |
| 6,905,550 B2 | 6/2005 | Labib |
| 2003/0192572 A1 | 10/2003 | Labib |
| 2005/0159322 A1 | 7/2005 | Min et al. |
| 2008/0039356 A1 | 2/2008 | Palmer et al. |
| 2008/0302136 A1 | 12/2008 | Bauer et al. |
| 2009/0065026 A1 | 3/2009 | Kiehlbauch et al. |
| 2011/0000511 A1* | 1/2011 | Mersch .............. A47L 15/0002 134/26 |
| 2012/0031432 A1* | 2/2012 | Beaudet ............. A47L 15/4293 134/18 |
| 2013/0264245 A1 | 10/2013 | Castillo et al. |
| 2016/0032225 A1* | 2/2016 | Kavchok .................. C11D 3/08 510/229 |
| 2024/0383014 A1* | 11/2024 | Deng .................. C03C 23/0075 |

FOREIGN PATENT DOCUMENTS

| | | | | |
|---|---|---|---|---|
| EP | 3187089 A1 * | 7/2017 | ............. | A47L 15/46 |
| EP | 3187090 A1 * | 7/2017 | ......... | A47L 15/0028 |

* cited by examiner

*Primary Examiner* — Sharidan Carrillo

(57) ABSTRACT

Methods of cleaning glass comprise mixing the glass with a peroxide-containing aqueous solution and heating the glass at a temperature of about 100° C. or more. In aspects, 50 wt % of the peroxide-containing aqueous solution based on an amount of the glass is mixed with the glass. The peroxide-containing aqueous solution can be removed from the glass before the heating. Alternatively, in aspects, from 10 wt % to 50 wt % of the peroxide-containing aqueous solution based on an amount of the glass can be mixed with the glass.

17 Claims, 5 Drawing Sheets

METHODS OF CLEANING GLASS

This application claims the benefit of priority under 35 U.S.C. § 119 of U.S. Provisional Application Ser. No. 63/467,638 filed on May 19, 2023, the content of which is relied upon and incorporated herein by reference in its entirety.

FIELD

The present disclosure relates to methods of cleaning glass, and more particularly to methods of cleaning glass using a peroxide-containing aqueous solution.

BACKGROUND

Display devices include liquid crystal displays (LCDs), electrophoretic displays (EPD), organic light-emitting diode displays (OLEDs), plasma display panels (PDPs), or the like. Display devices can be part of a portable electronic device, for example, a consumer electronic product, a smartphone, a tablet, a wearable device, or a laptop. It is known to provide a glass article as part of a display device.

During the manufacturing of glass articles from a glass web, portions of the glass web can be separated or otherwise discarded. There is a desire to reuse the discarded portions to form more glass. However, the discarded portions can be contaminated, for example with organic material, and the contamination can impair the quality of glass made from remelting the contaminated glass. Also, acid etching can leach metal ions from the glass, which can change the composition and/or properties of the glass to be reused. Also, discarded portions could be processed to recover expensive materials if the contamination is first removed. For example, glasses can contain lithium, which is expensive and is increasingly important to battery technology and reducing greenhouse gas emissions. Consequently, there is a need to remove contamination from glass so that the glass can be recycled into more glass or to recover materials.

SUMMARY

The present disclosure provides methods of cleaning glass, which removes contamination from the glass to enable the glass to be recycled and/or components of the glass to be recovered (i.e., extracted) using low energy and environmentally friendly materials. Methods comprise mixing the contaminated glass with a peroxide-containing aqueous solution. Providing a peroxide-containing aqueous solution can act as an oxidizer to facilitate the removal of organic contaminants from the glass. Providing a concentration of the peroxide-containing compound in the peroxide-containing aqueous solution of about 5 wt % or more (e.g., 8 wt % or more, 10 wt % or more) can enable full oxidation of organic contamination of the glass even when relatively small amounts (e.g., 50 wt % or less, 20 wt % or less) of the peroxide-containing aqueous solution are mixed with the glass. In aspects, providing a relatively small amount (e.g., 50 wt % or less, 20 wt % or less) of the peroxide-containing aqueous solution can reduce an amount of energy required to remove the peroxide-containing aqueous solution from the glass. Alternatively, providing a relatively large amount (e.g., 50 wt % or more, 100 wt % or less) of the peroxide-containing aqueous solution can enable inorganic contaminants and/or organic contaminants (e.g., oxidized by the peroxide-containing material and/or solubilized by the optional surfactant). In aspects, providing a surfactant can enable the peroxide-containing aqueous solution to solubilize contamination (e.g., inorganic contamination, oil-soluble organic contamination), for example, that can be separated from the glass and/or washed away. In aspects, mixing the glass in an oxygen-containing environment can facilitate oxidation of organic contaminants on the glass. Mixing the powder and the peroxide-containing aqueous solution at a relatively low temperature (e.g., less than 70° C., about 50° C. or less, about 40° C. or less) can reduce an amount of energy and cost associated with cleaning the glass. Providing 10 minutes or more after the adding the peroxide-containing aqueous solution to the glass before heating the glass can enable the peroxide-containing aqueous solution to react with (e.g., oxidize) organic contaminants on the glass. In aspects, removing the peroxide-containing aqueous solution from the glass before heating the glass can reduce an amount of energy used in the method and/or remove at least a portion of contaminants (e.g., organic contaminants, inorganic contaminants). In aspects, the contaminated glass can be provided as a powder (e.g., with a median particle size from about 1 μm to about 1 mm), which can increase a surface area of the glass to enable the peroxide-containing aqueous solution to oxide organic contamination, enable the glass to more easily be mixed with the peroxide-containing aqueous solution, and/or increase a packing efficiency of the glass to reduce an amount of space required to clean the glass.

Heating at a temperature of 350° C. or less (e.g., 280° C. or less, or 250° C. or less) can reduce the energy used to clean the glass. Heating at a temperature of 100° C. or more can remove the peroxide-containing aqueous solution and enable the oxidation and volatilization of organic contaminants on the glass treated with the peroxide-containing aqueous solution. Methods can remove greater than 90 wt % of an amount of organic contaminants in the glass based on an initial amount of organic contaminants initially present in the glass. Without wishing to be bound by theory, methods can oxidize organic contaminants that enables the organic contaminants to be removed more completely than heating alone. For example, as indicated in the Example discussed herein, an amount of organic contamination remaining (e.g., carbon), as a percentage of an amount of organic contamination for glass subject to the same heating conditions but without the mixing, can be about 33 wt % or less (i.e., at least 3 times more effective), about 25 wt % or less (i.e., at least 4 times more effective), about 20 wt % or less (i.e., at least 5 times more effective), about 16 wt % or less (i.e., at least 6 times more effective), about 14 wt % or less (i.e., at least 7 times more effective), about 12 wt % or less (i.e., at least 8 times more effective), about 11 wt % or less (i.e., at least 9 times more effective), or about 10 wt % or less (i.e., at least 10 times more effective). In aspects, an amount of organic contamination remaining (e.g., carbon) after the method of the present disclosure, based on the amount of glass, can be about 1000 parts-per-million (ppm) or less, about 750 ppm or less, about 500 ppm or less, about 300 ppm or less, about 200 ppm or less, or about 100 ppm or less.

Some example aspects of the disclosure are described below with the understanding that any of the features of the various aspects may be used alone or in combination with one another.

Aspect 1. A method of cleaning glass comprising:
mixing the glass with 50 wt % or more of a peroxide-containing aqueous solution based on an amount of the glass for a period of time;
removing the peroxide-containing aqueous solution from the glass; and then heating the glass at a temperature of about 100° C. or more.

Aspect 2. The method of aspect 1, wherein the peroxide-containing aqueous solution comprises from about 5 wt % to about 30 wt % of hydrogen peroxide based on an amount of the peroxide-containing aqueous solution.

Aspect 3. The method of any one of aspect 2, wherein the peroxide-containing aqueous solution comprises from about 0.1 wt % to about 5 wt % of a surfactant based on the amount of the peroxide-containing aqueous solution.

Aspect 4. The method of any one of aspects 1-3, wherein the mixing occurs in an oxygen-containing environment.

Aspect 5. The method of aspect 4, wherein the oxygen-containing environment contains greater than 25 vol % oxygen.

Aspect 6. The method of any one of aspects 1-5, wherein the period of time for the mixing is from about 10 minutes to about 8 hours.

Aspect 7. The method of any one of aspects 1-6, wherein the removing comprises applying a vacuum.

Aspect 8. The method of any one of aspects 1-6, wherein the removing comprises using filtration.

Aspect 9. The method of any one of aspects 1-8, further comprising, after the removing the peroxide-containing aqueous solution and before the heating:
rinsing the glass with deionized water; and
removing the deionized water by applying a vacuum, using filtration, or a combination thereof.

Aspect 10. The method of any one of aspects 1-9, wherein the mixing occurs at a temperature less than 70° C.

Aspect 11. The method of any one of aspects 1-10, wherein the heating the glass comprising heating at the temperature from about 100° C. to about 350° C. for from about 1 hour to about 8 hours.

Aspect 12. The method of aspect 11, wherein an amount of deionized water is from about 50 wt % to about 500 wt % of the amount of the glass.

Aspect 13. The method of any one of aspects 1-12, wherein the glass comprises a powder comprising a median particle size from about 1 micrometer to about 1 millimeter.

Aspect 14. The method of any one of aspects 1-13, wherein the method removes greater than 90 wt % of an amount of organic contaminants in the glass before the mixing.

Aspect 15. The method of any one of aspects 1-14, wherein, after the heating, the glass comprises less than 1000 ppm carbon.

Aspect 16. The method of any one of aspects 1-14, wherein, after the heating, the glass comprises less than 500 ppm carbon.

Aspect 17. The method of any one of aspects 1-14, wherein, using water instead of the peroxide-containing aqueous solution produces glass with 10% or more carbon than using the peroxide-containing aqueous solution.

Aspect 18. A method of cleaning glass comprising:
mixing the glass with from 10 wt % to 50 wt % of a peroxide-containing aqueous solution based on an amount of the glass for a period of time; and then
heating the glass at a temperature of about 100° C. or more.

Aspect 19. The method of aspect 18, wherein the peroxide-containing aqueous solution comprises from about 5 wt % to about 30 wt % of hydrogen peroxide based on an amount of the peroxide-containing aqueous solution.

Aspect 20. The method of any one of aspects 18-19, wherein the mixing occurs for the period of time from about 10 minutes to about 4 hours at a temperature less than 70° C.

Aspect 21. The method of any one of aspects 18-20, wherein the heating occurs at the temperature from about 100° C. to about 350° C. for from about 1 hour to about 4 hours.

Aspect 22. The method of any one of aspects 18-21, wherein the glass comprises a powder comprising a median particle size from about 1 micrometer to about 1 millimeter.

Aspect 23. The method of any one of aspects 18-22, wherein the method removes greater than 90 wt % of an amount of organic contaminants in the glass before the mixing.

Aspect 24. The method of any one of aspects 18-23, wherein, after the heating, the glass comprises less than 1000 ppm carbon.

Aspect 25. The method of any one of aspects 18-23, wherein, after the heating, the glass comprises less than 750 ppm carbon.

BRIEF DESCRIPTION OF THE DRAWINGS

The above and other features and advantages of aspects of the present disclosure are better understood when the following detailed description is read with reference to the accompanying drawings, in which.

Figure 2:
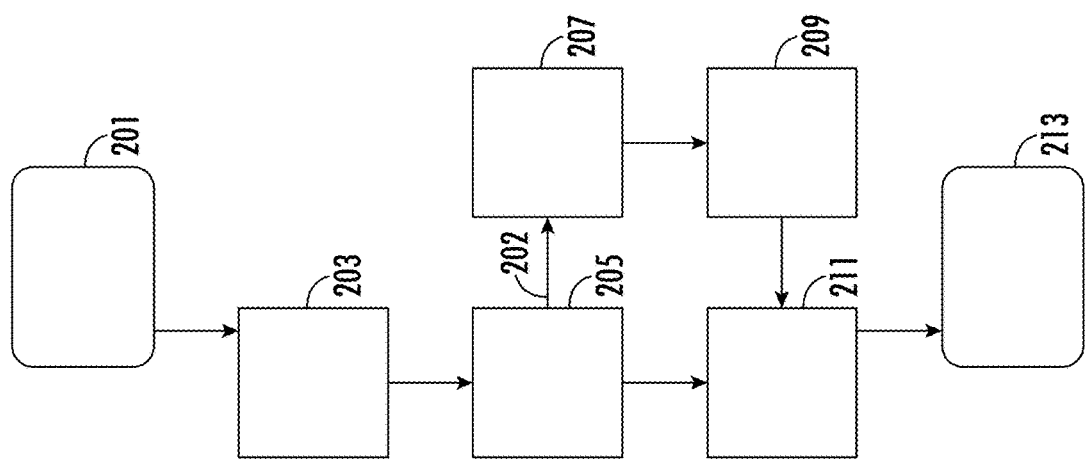
FIG. 2 is a flow chart illustrating example methods of cleaning glass using 50 wt % or more of the peroxide-containing aqueous solution.

Throughout the disclosure, the drawings are used to emphasize certain aspects. As such, it should not be assumed that the relative size of different regions, portions, and substrates shown in the drawings are proportional to its actual relative size, unless explicitly indicated otherwise.

DETAILED DESCRIPTION

Aspects will now be described more fully hereinafter with reference to the accompanying drawings in which example aspects are shown. Whenever possible, the same reference numerals are used throughout the drawings to refer to the same or like parts. Unless otherwise noted, a discussion of features of aspects of one method or step can apply equally to corresponding features of any aspects of the disclosure. For example, identical part numbers throughout the disclosure can indicate that, in some aspects, the identified features are identical to one another and that the discussion of the identified feature of one aspect, unless otherwise noted, can apply equally to the identified feature of any of the other aspects of the disclosure.

Aspects of methods of cleaning glass in accordance with aspects of the disclosure will be discussed with reference to the flow charts in FIGS. 1-2 and the example method steps illustrated in FIGS. 3-6. In a first set of aspects, methods will be discussed with reference to the flow chart in FIG. 1 and the example method steps illustrated in FIGS. 3 and 6.

Figure 1:
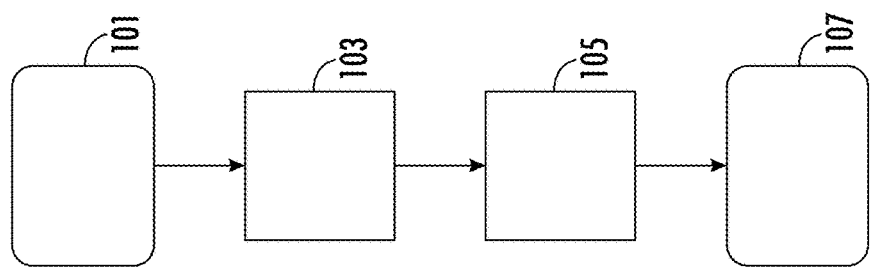
FIG. 1 is a flow chart illustrating example methods of cleaning glass with a single mixing step with 50 wt % or less of the peroxide-containing aqueous solution and the glass.
Figure 3:
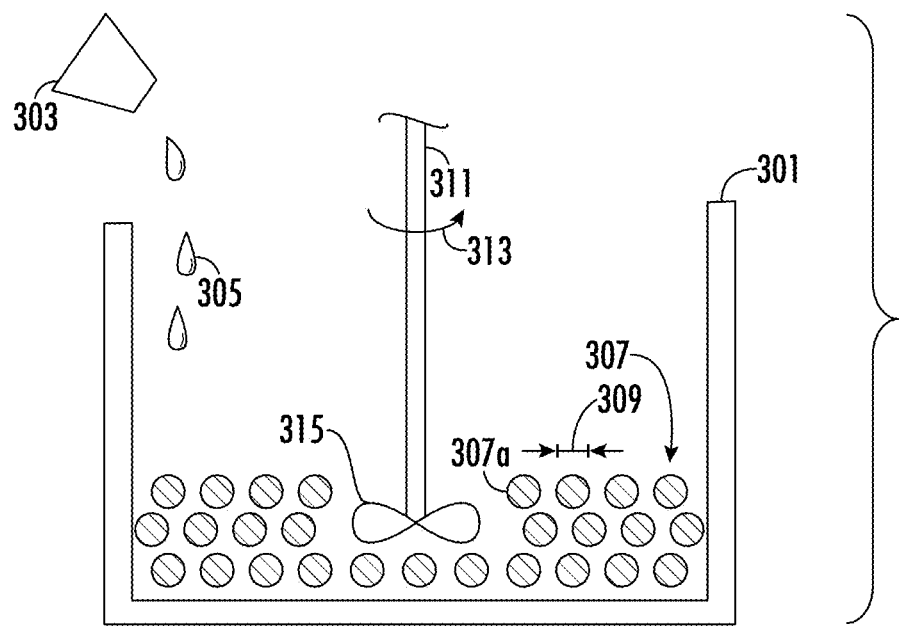
FIG. 3 illustrates a step in an exemplary method comprising mixing the glass with a peroxide-containing aqueous solution.

As shown in FIGS. 1 and 3, methods can start at step 101 comprising providing glass to be cleaned. In aspects, the glass can be contaminated with organic materials, for example, oils, fatty acids polymers, and common additives such as anti-rust agents, corrosion inhibitors, defoaming agents, leveling agents, antioxidants, and/or colorants. Additionally and/or alternatively, the glass can be contaminated with inorganic materials, for example, colorants. One or more contaminants may come into contact with the glass during processing the glass (e.g., cutting). In aspects, the glass can be crushed or ground to form a powder. In aspects, as shown in FIG. 3, the glass can comprise a powder 307. In further aspects, as shown, the powder can comprise a plurality of glass particulates including particulate 307a with a particle size 309.

As used herein, an "effective diameter" of a particulate means a diameter that produces the same area or volume as the measured particulate. For example, for a two-dimensional image (e.g., microscopy image), the effective diameter has the same area as the particulate shown (i.e., the area is multiplied by $4/\pi$ and then the square root is taken). For spheres, the effective diameter can correspond to an actual diameter. For example, particulate 307a is shown as circular; so an effective diameter based on this depiction would be equal to the dimension shown as the particle size 309. Such measurements are made by measuring microscopy images (e.g., TEM or SEM images) of the powder comprising the plurality of glass particulates. As used herein, the "median particle size" refers to a median value of a distribution of effective diameters of the plurality of particulates. In further aspects, a median particle size of the plurality of glass particulates in the powder 307 can be about 1 micrometer (μm) or more, about 5 μm or more, about 10 μm or more, about 15 μm or more, about 20 μm or more, about 25 μm or more, about 1 millimeter (mm) or less, about 800 μm or less, about 500 μm or less, about 300 μm or less, about 100 μm or less, about 40 μm or less, about 30 μm or less, or about 20 μm or less. In further aspects, a median particle size of the plurality of glass particulates in the powder 307 can be in a range from about 1 μm to about 1 mm, from about 5 μm to about 800 μm, from about 10 μm to about 500 μm, from about 15 μm to about 300 μm, from about 20 μm to about 100 μm, from about 25 μm to about 40 μm, or any range or subrange therebetween. Providing the glass as a powder (e.g., with a median particle size from about 1 μm to about 1 mm) can increase a surface area of the glass to enable the peroxide-containing aqueous solution to oxide organic contamination, enable the glass to more easily be mixed with the peroxide-containing aqueous solution, and/or increase a packing efficiency of the glass to reduce an amount of space required to clean the glass.

After step 101, as shown in FIG. 3, methods can proceed to step 103 comprising mixing the glass (e.g., powder 307) with a solution 305 (e.g., peroxide-containing aqueous solution). In aspects, as shown, the solution 305 (e.g., peroxide-containing aqueous solution) can be dispensed from a container 303 (e.g., conduit, flexible tube, micropipette, or syringe) onto another container 301 in which the powder 307 is contained. As used herein, an aqueous solution of "X" means that "X" is dissolved in a solvent comprising water. In aspects, the solvent of the aqueous solution can consist of water. As used herein, a peroxide-containing compound contains two oxygen atoms bonded together (i.e., $R_1$—O—O—$R_2$, where $R_1$ and $R_2$ can independently be hydrogen or an organic group). In aspects, the peroxide-containing compound can exclude peroxy acids (e.g., peroxymonosulfuric acid, peroxymonophosphoric acid) that may etch the glass. In aspects, the peroxide-containing compound can comprise benzoyl peroxide, an alkyl hydroperoxide (e.g., ethyl hydroperoxide), a percarbonate (e.g., oxygen bleach), hydrogen peroxide, or combinations thereof. An exemplary aspect of a peroxide-containing compound is hydrogen peroxide ($H_2O_2$).

In aspects, an amount (wt %) of the peroxide-containing compound in the peroxide-containing aqueous solution, based on a total weight of the peroxide-containing aqueous solution, can be about 0.1 wt % or more, about 1 wt % or more, about 3 wt % or more, about 5 wt % or more, about 10 wt % or more, about 12 wt % or more, about 15 wt % or more, about 18 wt % or more, about 20 wt % or more, about 22 wt % or more, about 50 wt % or less, about 45 wt % or less, about 40 wt % or less, about 35 wt % or less, about 30 wt % or less, about 25 wt % or less, about 20 wt % or less, or about 15 wt % or less. In aspects, amount (wt %) of the peroxide-containing compound in the peroxide-containing aqueous solution, based on a total weight of the peroxide-containing aqueous solution, can be in a range from about 0.1 wt % to about 50 wt %, from about 1 wt % to about 50 wt %, from about 3 wt % to about 40 wt %, from about 5 wt % to about 30 wt %, from about 10 wt % to about 30 wt %, from about 12 wt % to about 25 wt %, from about 15 wt % to about 25 wt %, from about 15 wt % to about 25 wt %, or any range or subrange therebetween. Providing a peroxide-containing aqueous solution can act as an oxidizer to facilitate the removal of organic contaminants from the glass. Providing a concentration of the peroxide-containing compound in the peroxide-containing aqueous solution of about 5 wt % or more (e.g., 8 wt % or more, 10 wt % or more) can enable full oxidation of organic contamination of the glass even when relatively small amounts (e.g., 50 wt % or less, 20 wt % or less) of the peroxide-containing aqueous solution are mixed with the glass.

In aspects, an amount (wt %) of the peroxide-containing aqueous solution, based on a total weight of the glass, added to the glass in step 103 can be about 10 wt % or more, about 15 wt %, about 20 wt % or more, about 25 wt % or more, about 50 wt % or less, about 40 wt % or less, about 35 wt % or less, about 30 wt % or less, about 25 wt % or less, or about 20 wt % or less. In aspects, an amount (wt %) of the peroxide-containing aqueous solution, based on a total weight of the glass, added to the glass in step 103 can be in a range from about 10 wt % to about 50 wt %, from about 10 wt % to about 40 wt %, from about 15 wt % to about 35 wt %, from about 15 wt % to about 25 wt %, from about 20 wt % to about 25 wt %, or any range or subrange therebetween. Providing a relatively small amount (e.g., 50 wt % or less, 20 wt % or less) of the peroxide-containing aqueous solution can reduce an amount of energy required to remove the peroxide-containing aqueous solution from the glass.

In aspects, as shown in FIG. 3, the glass (e.g., powder 307) can be mixed with the solution 305 (e.g., peroxide-containing aqueous solution). In further aspects, as shown, the mixing can comprise rotating an impeller 315 by rotating (arrow 313) a shaft 311 connected thereto, for example, with the shaft driven by a motor. In aspects, the mixing can occur for 1 minute or more. Alternatively or additionally, the mixing can comprise passive mixing, where the glass (e.g., powder 307) and the peroxide-containing aqueous solution are allowed to rest for a period of time before proceeding to step 105. In further aspects, the period of time (for active mixing and/or passive mixing) can be about 1 minute or more, about 5 minutes or more, about 10 minutes or more, about 15 minutes or more, about 8 hours or less, about 4 hours or less, about 2 hours or less, about 1 hour or less, about 45 minutes or less, or about 30 minutes or less. In further aspects, the period of time (for active mixing and/or passive mixing) can be in a range from about 1 minute to about 8 hours, from about 5 minutes to about 4 hours, from about 10 minutes to about 4 hours, from about 10 minutes to about 2 hours, from about 15 minutes to about 1 hour, from about 20 minutes to about 45 minutes, from about 20 minutes to about 30 minutes, or any range or subrange therebetween. Providing 10 minutes or more after the adding the peroxide-containing aqueous solution to the glass before heating the glass can enable the peroxide-containing aqueous solution to react with (e.g., oxidize) organic contaminants on the glass.

In aspects, during step 103, the mixing can occur at a temperature of less than 70° C., about 50° C. or less, about 40° C. or less, about 35° C. or less, or about 30° C. or less, about 10° C. or more, about 15° C. or more, about 20° C. or more, or about 25° C. or more. In aspects, during step 103, the mixing can occur at a temperature in a range from about 10° C. to less than 70° C., from about 15° C. to about 50° C., from about 20° C. to about 40° C., from about 20° C. to about 35° C., from about 25° C. to about 30° C., or any range or subrange therebetween. Mixing the powder and the peroxide-containing aqueous solution at a relatively low temperature (e.g., less than 70° C., about 50° C. or less, about 40° C. or less) can reduce an amount of energy and cost associated with cleaning the glass.

Figure 6:
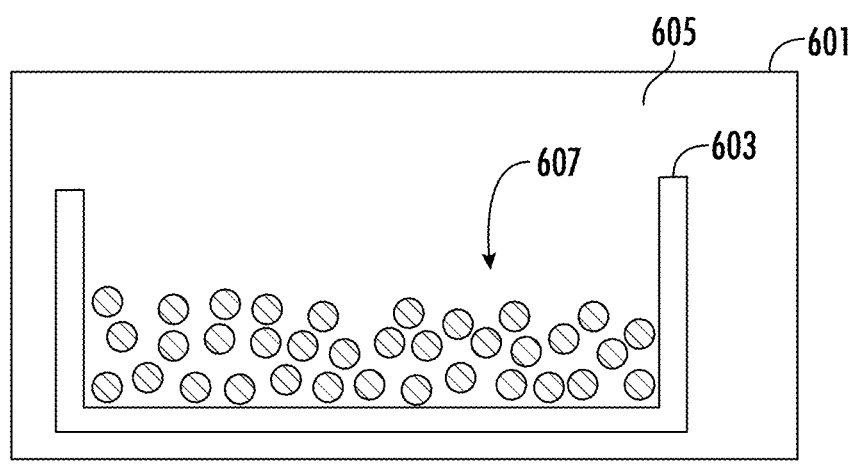
FIG. 6 illustrates a step in an exemplary method comprising heating the glass.

After step 103, as shown in FIG. 6, methods can proceed to step 105 comprising heating the glass at a temperature of about 100° C. or more. In aspects, as shown in FIG. 6, heating the glass can comprise heating the treated powder 607 in a container 603 placed in an oven 601 maintained at the temperature. In further aspects, an environment 605 in the oven 601 can comprise an oxygen-containing atmosphere, which can facilitate oxidation of organic contaminants on the glass in addition to the peroxide-containing compound. In even further aspects, the environment can be oxygen-rich relative to air, for example, with 25 wt % or more oxygen based on a total weight of the atmosphere. In aspects, the heating in step 105 can occur for a period of time that is about 30 minutes or more, about 1 hour or more, about 1.5 hours or more, about 2 hours or more, about 8 hours or less, about 4 hours or less, about 3 hours or less, or about 2 hours or less. In aspects, the heating in step 105 can occur for a period of time in a range from about 30 minutes to about 8 hours, from about 1 hour to about 4 hours, from about 1.5 hours to about 3 hours, from about 2 hours to about 3 hours, or any range or subrange therebetween. In aspects, step 105 can comprise heating the glass (e.g., treated powder 607) at a temperature of about 100° C. or more, about 120° C. or more, about 150° C. or more, about 180° C. or more, about 200° C. or more, about 500° C. or less, about 350° C. or less, about 300° C. or less, about 280° C. or less, about 250° C. or less, about 200° C. or less, about 180° C. or less, or about 150° C. or less. In aspects, step 105 can comprise heating the glass (e.g., treated powder 607) at a temperature in a range from about 100° C. to about 500° C., from about 100° C. to about 350° C., from about 100° C. to about 300° C., from about 100° C. to about 280° C., from about 120° C. to about 250° C., from about 120° C. to about 200° C., from about 120° C. to about 180° C., or any range or subrange therebetween. In aspects, the temperature that the glass (e.g., treated powder 607) at a temperature of 350° C. or less (e.g., from about 100° C. to 350° C.), 280° C. or less (e.g., from about 100° C. to 280° C.), or 250° C. or less (e.g., from about 100° C. to 250° C.). Heating at a temperature of 350° C. or less (e.g., 280° C. or less, or 250° C. or less) can reduce the energy used to clean the glass. Heating at a temperature of 100° C. or more can remove the peroxide-containing aqueous solution and enable the oxidation and volatilization of organic contaminants on the glass treated with the peroxide-containing aqueous solution.

After step 105, methods can be completed upon reaching step 107. In aspects, methods can remove greater than 90 wt % of an amount of organic contaminants in the glass based on an initial amount of organic contaminants in the glass before the mixing in step 103. In further aspects, an amount of organic contaminants removed by methods can be about 91 wt % or more, about 92 wt % or more, about 93 wt % or more, about 94 wt % or more, about 95 wt % or more, about 96 wt % or more, about 97 wt % or more, about 98 wt % or more, or about 99 wt % or more. Without wishing to be bound by theory, methods can oxidize organic contaminants that enables the organic contaminants to be removed more completely than heating alone. For example, as indicated in the Examples discussed herein, an amount of organic contamination remaining (e.g., carbon) after step 105, as a percentage of an amount of organic contamination for glass subject to the same heating conditions as step 105 but without the mixing in step 103, can be about 33 wt % or less (i.e., at least 3 times more effective), about 30 wt % or less, about 27 wt % or less, about 25 wt % or less (i.e., at least 4 times more effective), about 22 wt % or less, about 20 wt % or less (i.e., at least 5 times more effective), about 18 wt % or less, about 16 wt % or less (i.e., at least 6 times more effective), about 14 wt % or less (i.e., at least 7 times more effective), about 12 wt % or less (i.e., at least 8 times more effective), about 11 wt % or less (i.e., at least 9 times more effective), about 10 wt % or less (i.e., at least 10 times more effective), about 9 wt % or less, or about 8 wt % or less. In aspects, an amount of organic contamination remaining (e.g., carbon) after step 105, based on the amount of glass after step 105, can be about 1000 parts-per-million (ppm) or less, about 750 ppm or less, about 600 ppm or less, about 500 ppm or less, about 300 ppm or less, about 200 ppm or less, or about 100 ppm or less, for example, in a range from about 1 ppm to about 1000 ppm, from about 5 ppm to about 750 ppm, from about 10 ppm to about 600 ppm, from about 20 ppm to about 500 ppm, from about 30 ppm to about 300 ppm, from about 50 ppm to about 200 ppm, or any range or subrange therebetween.

Figure 4:
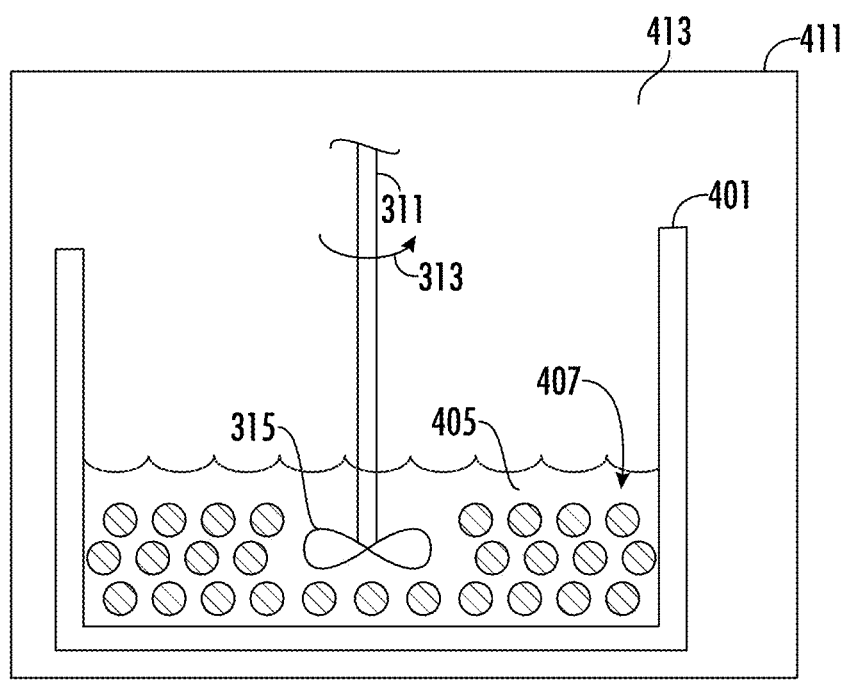
FIG. 4 illustrates a step in an exemplary method comprising mixing the glass with a peroxide-containing aqueous solution.

In a second set of aspects, methods will be discussed with reference to the flow chart in FIG. 2 and the example method steps illustrated in FIGS. 3-6. As shown in FIGS. 2 and 4, methods can start at step 201 comprising providing glass to be cleaned. Step 201 can comprise one or more of the aspects discussed above with reference to step 101, and/or step 201 can be identical to step 101. In aspects, as shown in FIG. 4, the glass can comprise a powder 407. In further aspects, the powder can comprise a plurality of glass particulates with a median particle size that can be within one or more of the ranges discussed above with reference to step 101.

After step 201, as shown in FIG. 4, methods can proceed to step 203 comprising mixing the glass (e.g., powder 407)

with a peroxide-containing aqueous solution 405. In aspects, although not shown in FIG. 4, the peroxide-containing aqueous solution can be dispensed from a container (e.g., conduit, flexible tube, micropipette, or syringe) onto another container in which the powder is contained. In aspects, the peroxide-containing compound can exclude peroxy acids (e.g., peroxymonosulfuric acid, peroxymonophosphoric acid) that may etch the glass. In aspects, the peroxide-containing compound can comprise benzoyl peroxide, an alkyl hydroperoxide (e.g., ethyl hydroperoxide), a percarbonate (e.g., oxygen bleach), hydrogen peroxide, or combinations thereof. An exemplary aspect of a peroxide-containing compound is hydrogen peroxide ($H_2O_2$). In aspects, an amount (wt %) of the peroxide-containing compound in the peroxide-containing aqueous solution, based on a total weight of the peroxide-containing aqueous solution, can be within one or more of the ranges discussed above with reference to step 103 (e.g., from about 5 wt % to about 30 wt %, from about 10 wt % to about 20 wt %, or from about 5 wt % to about 15 wt %). Providing a concentration of the peroxide-containing compound in the peroxide-containing aqueous solution of about 5 wt % or more (e.g., 8 wt % or more, 10 wt % or more) can enable full oxidation of organic contamination of the glass when the peroxide-containing aqueous solution are mixed with the glass.

In aspects, the peroxide-containing aqueous solution can optionally contain a surfactant. In further aspects, a concentration of the surfactant in the peroxide-containing aqueous solution, based on the total peroxide-containing aqueous solution, can be about 0.1 wt % or more, about 0.2 wt % or more, about 0.5 wt % or more, about 1 wt % or more, about 5 wt % or less, about 4 wt % or less, about 3 wt % or less, or about 2 wt % or less. In further aspects, a concentration of the surfactant in the peroxide-containing aqueous solution, based on the total peroxide-containing aqueous solution, can be in a range from about 0.1 wt % to about 5 wt %, from about 0.2 wt % to about 4 wt %, from about 0.5 wt % to about 3 wt %, from about 1 wt % to about 2 wt %, or any range or subrange therebetween. Providing a surfactant can enable the peroxide-containing aqueous solution to solubilize contamination (e.g., inorganic contamination, oil-soluble organic contamination), for example, that can be separated from the glass and/or washed away.

In aspects, an amount (wt %) of the peroxide-containing aqueous solution, based on a total weight of the glass, added to the glass in step 203 can be about 50 wt % or more, about 80 wt %, about 100 wt % or more, about 120 wt % or more, about 150 wt % or less, about 180 wt % or more, about 200 wt % or more, about 1000 wt % or less, about 500 wt % or less, about 400 wt % or less, about 350 wt % or less, about 300 wt % or less, about 250 wt % or less, or about 200 wt % or less. In aspects, an amount (wt %) of the peroxide-containing aqueous solution, based on a total weight of the glass, added to the glass in step 203 can be in a range from about 50 wt % to about 1000 wt %, from about 50 wt % to about 500 wt %, from about 80 wt % to about 400 wt %, from about 100 wt % to about 350 wt %, from about 120 wt % to about 350 wt %, from about 150 wt % to about 300 wt %, from about 200 wt % to about 250 wt %, or any range or subrange therebetween. Providing a relatively large amount (e.g., 50 wt % or more, 100 wt % or less) of the peroxide-containing aqueous solution can enable inorganic contaminants and/or organic contaminants (e.g., oxidized by the peroxide-containing material and/or solubilized by the optional surfactant).

In aspects, as shown in FIG. 4, the glass (e.g., powder 407) can be mixed with the peroxide-containing aqueous solution 405. In further aspects, as shown, the mixing can comprise rotating an impeller 315 by rotating (arrow 313) a shaft 311 connected thereto, for example, with the shaft driven by a motor. In aspects, the mixing can occur for 1 minute or more. Alternatively or additionally, the mixing can comprise passive mixing, where the glass (e.g., powder 407) and the peroxide-containing aqueous solution 405 are allowed to rest for a period of time before proceeding to step 205. In further aspects, the period of time (for active mixing and/or passive mixing) can be about 1 minute or more, about 5 minutes or more, about 10 minutes or more, about 15 minutes or more, about 20 minutes or more, about 30 minutes or more, about 8 hours or less, about 4 hours or less, about 2 hours or less, about 1 hour or less, about 45 minutes or less, or about 30 minutes or less. In further aspects, the period of time (for active mixing and/or passive mixing) can be in a range from about 10 minutes to about 8 hours, from about 15 minutes to about 4 hours, from about 20 minutes to about 4 hours, from about 30 minutes to about 2 hours, from about 30 minutes to about 1 hour, or any range or subrange therebetween. Providing 10 minutes or more after the adding the peroxide-containing aqueous solution to the glass before heating the glass can enable the peroxide-containing aqueous solution to react with (e.g., oxidize) organic contaminants on the glass. In aspects, during step 203, the mixing can occur at a temperature within one or more of the ranges discussed above with reference to step 103 (e.g., less than 70° C., about 50° C. or less, about 40° C. or less). Mixing the powder and the peroxide-containing aqueous solution at a relatively low temperature (e.g., less than 70° C., about 50° C. or less, about 40° C. or less) can reduce an amount of energy and cost associated with cleaning the glass.

In aspects, as shown in FIG. 4, the mixing in step 203 can occur in a controlled environment 413, for example, by being contained in a vessel 411. In further aspects, the controlled environment 413 can be an oxygen-containing environment. In even further aspects, the controlled environment 413 can be air (e.g., about 21 wt % oxygen). In even further aspects, the controlled environment 413 can comprise oxygen in an amount of 25 wt % or more, about 27 wt % or more, or about 30 wt % or more, for example in a range from about 25 wt % to about 66 wt %, from about 27 wt % to about 50 wt %, from about 30 wt % to about 40 wt %, or any range or subrange therebetween. Providing an oxygen-containing environment during the mixing can facilitate oxidation of organic contaminants on the glass.

Figure 5:
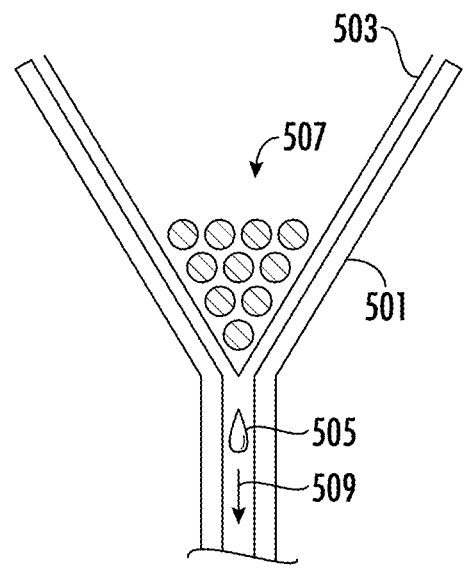
FIG. 5 illustrates a step in an exemplary method comprising removing the peroxide-containing aqueous solution from the glass.

After step 203, as shown in FIG. 5, methods can proceed to step 205 comprising removing the solution 505 (e.g., peroxide-containing aqueous) from the glass (e.g., powder 507). In aspects, as shown, the glass (e.g., powder 507) can be separated from the removing the solution 505 using filtration, for example, by placing the glass (e.g., powder 507) and the removing the solution 505 in a filter 503 positioned on a funnel 501. In further aspects, as shown, a vacuum (shown as arrow 509) can be applied to enhance the efficacy of the filtration to remove the solution 505 from the glass (e.g., powder 507). In aspects, the solution 505 can be removed from the glass (e.g., powder 507) by applying a vacuum (e.g., arrow 509). In further aspects, although not shown, the peroxide-containing aqueous solution can be removed by evaporating the peroxide-containing aqueous solution. For example, a rotary evaporator can be used to remove the peroxide-containing aqueous solution at a temperature within one or more of the ranges discussed above for steps 103 and 203. Removing the peroxide-containing aqueous solution from the glass before heating the glass can reduce an amount of energy used in the method and/or remove at least a portion of contaminants (e.g., organic contaminants, inorganic contaminants).

In aspects, after step 205, as shown in FIG. 3, methods can proceed to step 207 comprising rinsing the glass (e.g., powder 307) with a solution 305. In further aspects, as shown, the solution 305 (can be dispensed from a container 303 (e.g., conduit, flexible tube, micropipette, or syringe) onto another container 301 in which the glass (e.g., powder 307) is contained. An exemplary aspect of the solution for step 207 is deionized water. In further aspects, an amount of the solution (e.g., deionized water), based on a total weight of the glass, added to the glass in step 207 can be within one or more of the ranges discussed above with reference to the amount of the solution added in step 203 (e.g., about 50 wt % or more, about 100 wt % or more, from about 50 wt % to about 500 wt %). In further aspects, the solution 305 (e.g., deionized water) can be in contact with the glass (e.g., powder 307), before proceeding to step 209, for about 1 minute or more, about 5 minutes or more, about 10 minutes or more, about 15 minutes or more, or about 20 minutes or more, for example, in a range from about 1 minute to about 24 hours, from about 5 minutes to about 8 hours, from about 10 minutes to about 4 hours, from about 15 minutes to about 1 hour, from about 20 minutes to about 45 minutes, or any range or subrange therebetween. In further aspects, as shown, the rinsing can further comprise mixing, which can comprise rotating an impeller 315 by rotating (arrow 313) a shaft 311 connected thereto, for example, with the shaft driven by a motor. Allowing the solution to contact the glass and/or mixing the glass can facilitate removal of contaminants (e.g., organic contaminants, inorganic contaminants) including contaminants that may have been oxidized during step 203. Providing a relatively large amount (e.g., 50 wt % or more, 100 wt % or less) of the solution (e.g., deionized water) can further facilitate the removal of inorganic contaminants and/or organic contaminants (e.g., oxidized by the peroxide-containing material in step 203).

After step 207, as shown in FIG. 5, methods can proceed to step 209 comprising removing the solution 505 from the glass (e.g., powder 507). In aspects, step 209 can comprise one or more of the aspects discussed above with reference to step 205 and/or be identical to step 205. For example, the glass (e.g., powder 507) can be separated from the removing the solution 505 (e.g., peroxide-containing aqueous solution) using filtration, for example, by placing the glass (e.g., powder 507) and the removing the solution 505 in a filter 503 positioned on a funnel. In aspects, as shown, a vacuum (shown as arrow 509) can be applied to enhance the efficacy of any filtration, although a vacuum can be used to evaporate the solution in alternative aspects. Removing the solution from the glass before heating the glass can reduce an amount of energy used in the method and/or remove at least a portion of contaminants (e.g., organic contaminants, inorganic contaminants).

After step 205 or 209, as shown in FIG. 6, methods can proceed to step 211 comprising heating the glass at a temperature of about 100° C. or more. In aspects, as shown in FIG. 6, heating the glass can comprise heating the treated powder 607 in a container 603 placed in an oven 601 maintained at the temperature. In further aspects, an environment 605 in the oven 601 can comprise an oxygen-containing atmosphere, which can facilitate oxidation of organic contaminants on the glass in addition to the peroxide-containing compound. In even further aspects, the environment can be oxygen-rich relative to air, for example, with 25 wt % or more oxygen based on a total weight of the atmosphere. In aspects, the heating in step 211 can occur for a period of time that is about 30 minutes or more, about 1 hour or more, about 1.5 hours or more, about 2 hours or more, about 8 hours or less, about 4 hours or less, about 3 hours or less, or about 2 hours or less. In aspects, the heating in step 211 can occur for a period of time in a range from about 30 minutes to about 8 hours, from about 1 hour to about 4 hours, from about 1.5 hours to about 3 hours, from about 2 hours to about 3 hours, or any range or subrange therebetween. In aspects, step 211 can comprise heating the glass (e.g., treated powder 607) at a temperature of about 100° C. or more, about 120° C. or more, about 150° C. or more, about 180° C. or more, about 200° C. or more, about 500° C. or less, about 350° C. or less, about 300° C. or less, about 280° C. or less, about 250° C. or less, about 200° C. or less, about 180° C. or less, or about 150° C. or less. In aspects, step 211 can comprise heating the glass (e.g., treated powder 607) at a temperature in a range from about 100° C. to about 500° C., from about 100° C. to about 350° C., from about 100° C. to about 300° C., from about 100° C. to about 280° C., from about 120° C. to about 250° C., from about 120° C. to about 200° C., from about 120° C. to about 180° C., or any range or subrange therebetween. In aspects, the temperature that the glass (e.g., treated powder 607) at a temperature of 350° C. or less (e.g., from about 100° C. to 350° C.), 280° C. or less (e.g., from about 100° C. to 280° C.), or 250° C. or less (e.g., from about 100° C. to 250° C.). Heating at a temperature of 350° C. or less (e.g., 280° C. or less, or 250° C. or less) can reduce the energy used to clean the glass. Heating at a temperature of 100° C. or more can remove the peroxide-containing aqueous solution and enable the oxidation and volatilization of organic contaminants on the glass treated with the peroxide-containing aqueous solution.

After step 211, methods can be completed upon reaching step 213. In aspects, methods can proceed sequentially through steps 201, 203, 205, 211, and 213 (i.e., without steps 207 and 209), for example, comprising mixing with a single peroxide-containing aqueous solution followed by removing the peroxide-containing aqueous solution and then heating the glass). Alternatively, in aspects, methods can follow arrow 202 to include steps 207 and 209 such that methods can proceed sequentially through steps 201, 203, 205, 207, 209, 211, and 213, for example, comprising treatment with and removal of a peroxide-containing aqueous solution followed by treatment with and removal of deionized water and then heating the glass). In aspects, methods can remove greater than 90 wt % of an amount of organic contaminants in the glass based on an initial amount of organic contaminants in the glass before the mixing in step 203. In further aspects, an amount of organic contaminants removed by methods can be about 91 wt % or more, about 92 wt % or more, about 93 wt % or more, about 94 wt % or more, about 95 wt % or more, about 96 wt % or more, about 97 wt % or more, about 98 wt % or more, or about 99 wt % or more. Without wishing to be bound by theory, methods can oxidize organic contaminants that enables the organic contaminants to be removed more completely than heating alone. For example, as indicated in the Examples discussed herein, an amount of organic contamination remaining (e.g., carbon) after step 211, as a percentage of an amount of organic contamination for glass subject to the same heating conditions as step 211 but without any additional steps (e.g., the mixing in step 203 or step 207), can be about 33 wt % or less (i.e., at least 3 times more effective), about 30 wt % or less, about 25 wt % or less (i.e., at least 4 times more effective), about 22 wt % or less, about 20 wt % or less (i.e., at least 5 times more effective), about 18 wt % or less, about 16 wt % or less (i.e., at least 6 times more effective), about 14 wt % or less (i.e., at least 7 times more effective), about 12 wt % or less (i.e., at least 8 times more effective), about 11 wt % or less (i.e., at least 9 times more effective), about 10 wt % or less (i.e., at least 10 times more effective), about 9 wt % or less, about 8 wt % or less, about 7 wt % or less, about 5 wt % or less, about 3 wt % or less, or about 2 wt % or less. In aspects, an amount of organic contamination remaining (e.g., carbon) after step 211, based on the amount of glass after step 211, can be about 1000 parts-per-million (ppm) or less, about 750 ppm or less, about 600 ppm or less, about 500 ppm or less, about 300 ppm or less, about 250 ppm or less, about 200 ppm or less, about 150 ppm or less, or about 100 ppm or less, for example, in a range from about 1 ppm to about 1000 ppm, from about 5 ppm to about 750 ppm, from about 10 ppm to about 600 ppm, from about 20 ppm to about 500 ppm, from about 30 ppm to about 300 ppm, from about 30 ppm to about 250 ppm, from about 50 ppm to about 200 ppm, or any range or subrange therebetween.

Further, mixing with a relatively large (e.g., 50 wt % or more, 100 wt % or more) amount of the peroxide-containing aqueous solution in step 203 can more completely remove organic contaminants than using deionized water (i.e., instead of the peroxide-containing aqueous solution) followed by heating. For example, as indicated in the Examples discussed herein, an amount of organic contamination remaining (e.g., carbon) after step 211, as a percentage of an amount of organic contamination for glass subject to treatment with an amount of deionized water equal to (and instead of) the amount of the peroxide-containing aqueous solution followed by the same heating conditions as step 211 but without any additional steps (e.g., the mixing in step 207), can be about 85 wt % or less, about 80 wt % or less, about 75 wt % or less, about 70 wt % or less, about 66 wt % or less, about 60 wt % or less, or about 50 wt % or less, for example, in a range from about 33 wt % to about 85 wt %, from about 40 wt % to about 80 wt %, from about 45 wt % to about 75 wt %, from about 50 wt % to about 70 wt %, or any range or subrange therebetween.

EXAMPLES

Various aspects will be further clarified by the following examples. Comparative Examples AA-CC comprised a commercially available cutting oil (Composition 1) without glass that was heated in an oven at the conditions in Table 1. Comparative Examples DD-OO and Examples 1-18 comprised powdered glass contaminated with the commercially available cutting oil (Composition 1). In Comparative Examples DD-II, the contaminated glass was heated in an oven at the condition in Table 2. In Comparative Examples JJ-OO, the contaminated glass was rinsed with 200 wt % (based on the weight of the glass) of deionized water and then heated in an oven at the condition in Table 2. In Examples 1-6, the contaminated glass was mixed with 20 wt % (based on a weight of the glass) of a peroxide-containing aqueous solution with 30 wt % $H_2O_2$ (based a weight of the peroxide-containing aqueous solution) for 1 hour and then heated in an oven at the condition in Table 2. In Examples 7-12, the contaminated glass was mixed with 200 wt % (based on a weight of the glass) of a peroxide-containing aqueous solution with 10 wt % $H_2O_2$ for 8 hours followed by vacuum filtration, rinsing with 200 wt % (based on a weight of the glass) of deionized water followed by vacuum filtration for 30 minutes, and then heated in an oven at the condition in Table 2. In Examples 13-18, the contaminated glass was mixed with 300 wt % (based on a weight of the glass) of a peroxide-containing aqueous solution with 10 wt % $H_2O_2$ for 8 hours followed by vacuum filtration, rinsing with 200 wt % (based on a weight of the glass) of deionized water followed by vacuum filtration for 30 minutes, and then heated in an oven at the condition in Table 2. Composition 1 of the commercially available cutting oil comprised about 23 wt % castor oil, 22 wt % deionized water, 12 wt % triethanolamine, 12 wt % glycerol, 4 wt % poly (ethylene oxide), 9 wt % of 2,4,6-Tri-(aminocaproic acid)-1,3,5-triazine, 9 wt % of a fatty acid additive, 9 wt % or an anti-rust agent, and 0.1 wt % or an inorganic colorant.

Table 1 reports the heating conditions (i.e., time and oven temperature) for Comparative Examples (CE) AA-CC and the amount of the initial amount of the commercially available cutting oil remaining after the heating. As shown in Table 1, after heating at 100° C. for 2 hours, Comparative Example AA had 45.8 wt % of the original cutting oil remaining. After heating at 250° C. for 2 hours, Comparative Example BB had 30 wt % of the original cutting oil remaining. Consequently, heating at a temperature of about 250° C. or less for 2 hours fails to remove at least two-thirds of the organic contaminants. After heating at 650° C. for 17 hours, Comparative Example CC still had 2 wt % of the original cutting oil remaining. This demonstrates that heating (e.g., calcining) at high temperatures and/or for an extended period of time, which is associated with high energy use, fails to remove more than 98 wt % of cutting oil. Without wishing to be bound by theory, it is believed that the content remaining after the heating in Comparative Example CC is a form of carbon black, which is a strong reducing agent that can negatively impact the quality of remelted glass.

TABLE 1

Properties of Comparative Examples AA-CC

| Example | Time (hrs) | Temperature (° C.) | Remaining (wt %) |
|---|---|---|---|
| CE AA | 2 | 100 | 45.8 |
| CE BB | 2 | 250 | 30.0 |
| CE CC | 17 | 650 | 2.0 |

Figure 7:
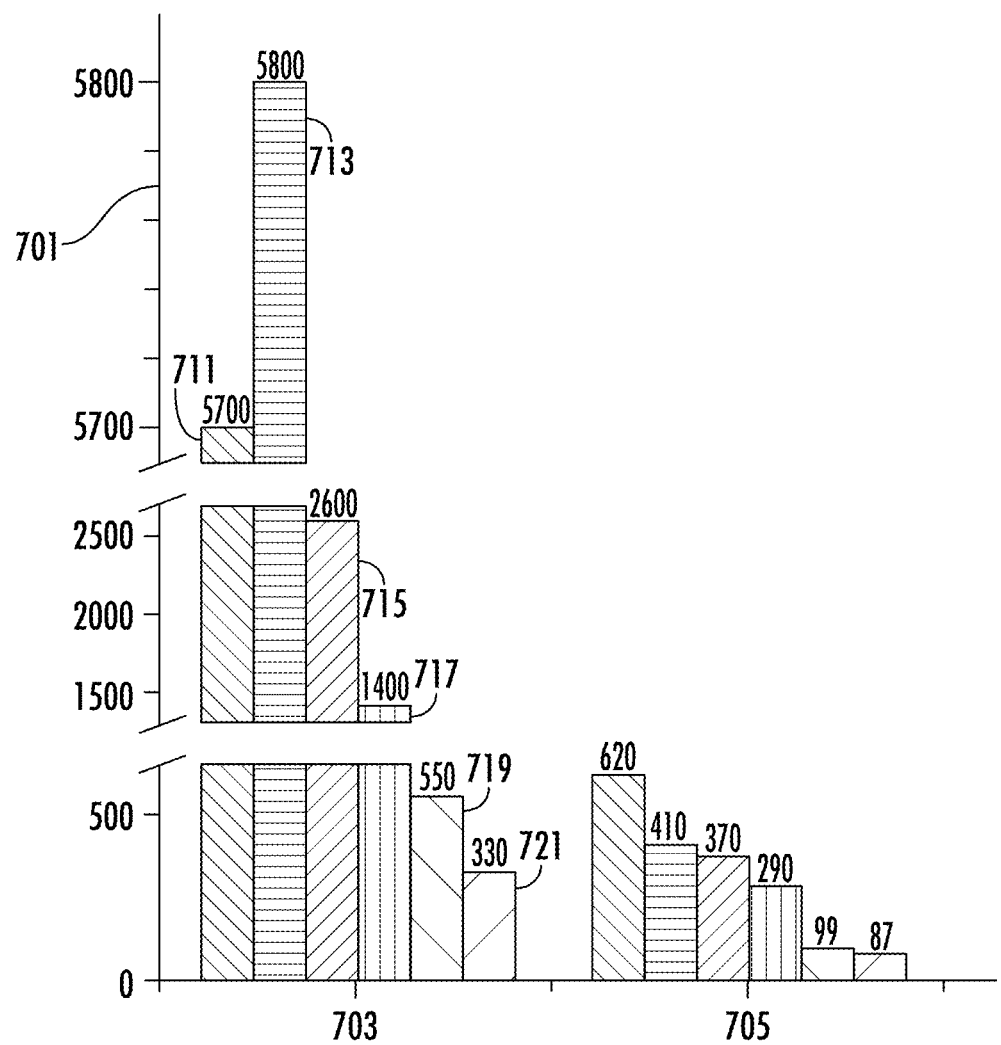
FIG. 7 illustrates results of Comparative Examples DD-II and Examples 1-6.
Figure 8:
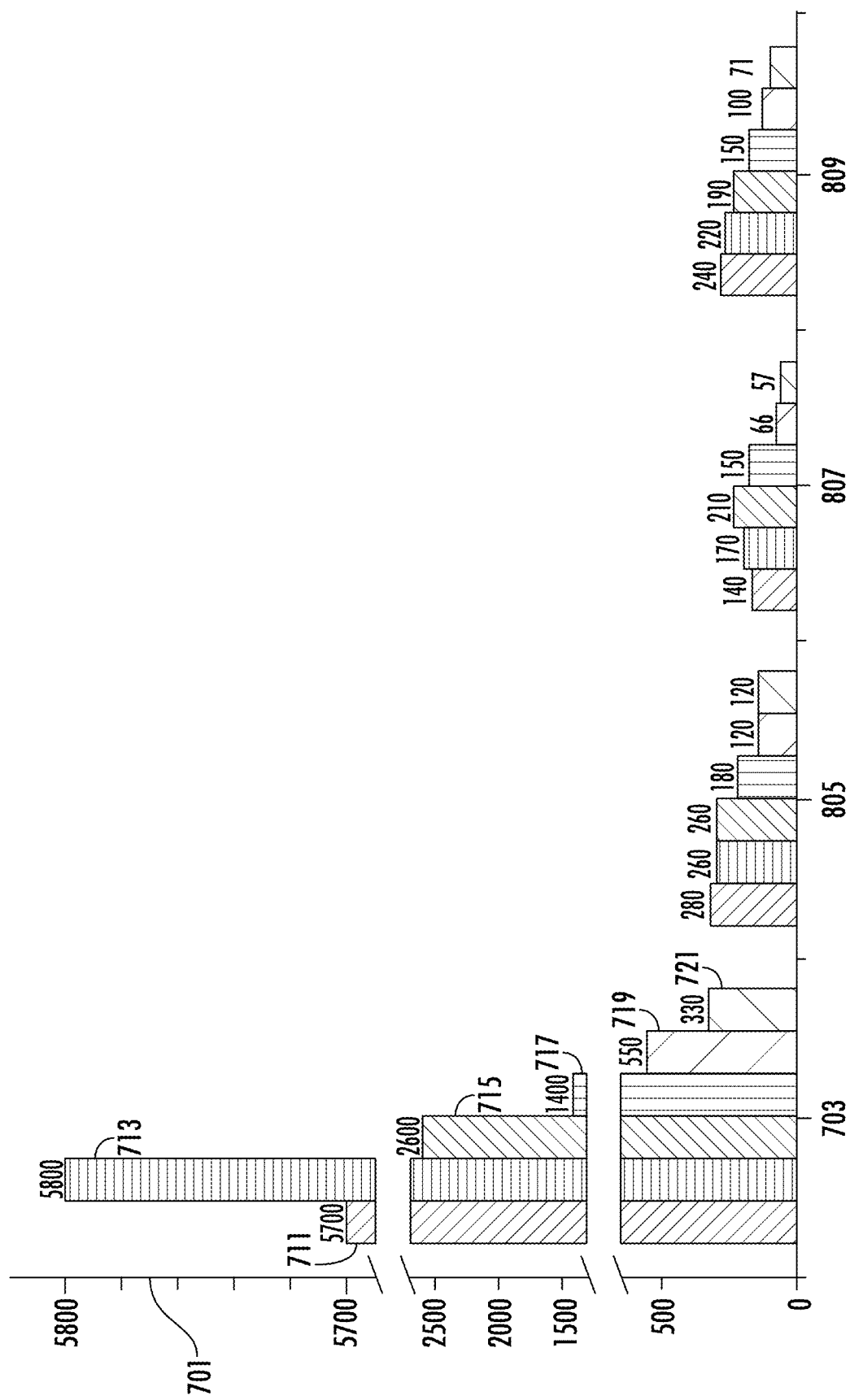
FIG. 8 illustrates results of Comparative Examples DD-OO and Examples 7-18.

Table 2 reports the treatment conditions and remaining organic content (in ppm) after the treatment conditions for Comparative Examples DD-OO and Examples 1-18. The example (or comparative example) is in parentheses below the amount of remaining organic content (in ppm). FIGS. 7-8 present the amount of organic contaminants (ppm) on the vertical axis 701 for the various treatment conditions grouped together by the solution mixed with the contaminated glass. Group 703 corresponds to Comparative Examples DD-II that were not mixed with any solution before being heated. Group 705 corresponds to Examples 1-6 that were mixed with 20 wt % of the peroxide-containing aqueous solution comprising 30 wt % $H_2O_2$ before being heated. Group 805 corresponds to Comparative Examples JJ-OO that were mixed with 300 wt % deionized water followed by 200 wt % deionized water and then heated. Group 809 corresponds to Examples 13-18 that were mixed with 300 wt % of the peroxide-containing aqueous solution comprising 10 wt % $H_2O_2$ and filtered, rinsed with 200 wt % of deionized water, and then heated. Group 807 corresponds to Examples 7-12 that were mixed with 200 wt % of the peroxide-containing aqueous solution comprising 10 wt % $H_2O_2$ and filtered, rinsed with 200 wt % of deionized water, and then heated. In FIGS. 7-8, consistent shading is used for each heating treatment: shading 711 is associated with heating at 100° C. for 4 hours; shading 713 is associated with heating at 100° C. for 24 hours; shading 715 is associated with heating at 250° C. for 4 hours, shading 717 is associated with heating at 250° C. for 24 hours; shading 719 is associated with heating at 350° C. for 4 hours; and shading 721 is associated with heating at 350° C. for 24 hours.

TABLE 2

Properties of Examples 1-8 and Comparative Examples DD-OO

| Examples/ Treatment (° C., hr) | $H_2O_2$ (wt % solution) and amount (wt % of glass) | 100° C., 4 hours | 100° C., 24 hours | 250° C., 4 hours | 250° C., 24 hours | 350° C., 4 hours | 350° C., 24 hours |
|---|---|---|---|---|---|---|---|
| CEs DD-II | None | 5700 (DD) | 5800 (EE) | 2600 (FF) | 1400 (GG) | 550 (HH) | 330 (II) |
| Exs. 1-6 | 30 wt % $H_2O_2$, 20 wt % | 620 (1) | 410 (2) | 370 (3) | 290 (4) | 99 (5) | 87 (6) |
| CEs JJ-OO | No $H_2O_2$, 300 wt % $H_2O$; 200 wt % $H_2O$ | 280 (JJ) | 260 (KK) | 260 (LL) | 180 (MM) | 120 (NN) | 120 (OO) |
| Exs. 7-12 | 10 wt % $H_2O_2$, 200 wt %; 200 wt % $H_2O$ | 240 (7) | 220 (8) | 190 (9) | 150 (10) | 100 (11) | 71 (12) |
| Exs. 13-18 | 10 wt % $H_2O_2$, 300 wt %; 200 wt % $H_2O$ | 140 (13) | 170 (14) | 210 (15) | 150 (16) | 68 (17) | 57 (18) |

As shown in FIGS. 7-8 and Table 2, heating at 100° C. had more than 5000 ppm contaminants remaining (Comparative Examples DD-EE), heating at 250° C. had more than 1000 ppm contaminants remaining (Comparative Examples FF-GG), and heating at 350° C. had 330 ppm or more contaminants remaining.

As discussed above, Examples 1-6 mixed with 20 wt % of the peroxide-containing aqueous solution comprising 30 wt % $H_2O_2$ for 1 hour before being heated at the conditions stated in Table 2. Examples 1-6 were conducted in accordance with the method discussed above with reference to the flow chart in FIG. 1. Examples 1-6 had less than 1000 ppm (e.g., less than 750 ppm) contaminants, which is about 11% of the organic contaminants remaining in Comparative Example DD. After heating at 100° C. for 4 hours (Example 1), the glass had 620 ppm contaminants. Examples 2-6 had less than 500 ppm contaminants. After heating at 350° C. for 4 hours (Example 5), the glass had 100 ppm or less contaminants. Examples 1-6 demonstrate that the peroxide-containing aqueous solution facilitates removal of organic contaminants, for example, by oxidizing the contaminants that can be volatilized during the heating.

Comparative Examples JJ-OO were mixed with 300 wt % deionized water for 8 hours, vacuum filtered, rinsed with 200 wt % deionized water, vacuum filtered for 30 minutes, and then heated at the conditions stated in Table 2. Comparative Examples JJ-LL comprised greater than 250 ppm contaminants. Comparative Examples MM-OO comprised greater than 100 ppm contaminants. Compared to Comparative Examples DD-II, Comparative Examples JJ-OO demonstrate that rinsing the contaminated glass can help remove organic contamination.

Compared to Comparative Examples DD-II, Examples 7-18 demonstrate the benefit of the peroxide-containing aqueous solution removing additional contamination from the glass. Instead of mixing with 300 wt % deionized water in Comparative Examples DD-II, Examples 7-12 were mixed with 200 wt % of the peroxide-containing aqueous solution comprising 10 wt % $H_2O_2$. Examples 7-12 have less than 1000 ppm, less than 750 ppm, less than 500 ppm, less than 300 ppm, and less than 250 ppm contamination. Examples 7-12 (including heating at 100° C. for 4 hours in Example 7) had less organic contamination than even Comparative Example II. Examples 9-12 (heating at 250° C. or 350° C.) have less than 200 ppm contamination. Examples 11-12 (heating at 350° C.) have 100 ppm or less contamination. Even though less liquid was used for mixing in Examples 7-12, compared to Comparative Examples JJ-OO, the hydrogen peroxide in the peroxide-containing aqueous solution is able to reduce organic contamination more than rinsing alone.

Compared to the Examples 7-12, Examples 13-18 were mixed with 300 wt % (instead of 200 wt %) of the peroxide-containing aqueous solution comprising 10 wt % $H_2O_2$. Examples 13-18 have less than 1000 ppm, less than 750 ppm, less than 500 ppm, less than 300 ppm, and less than 250 ppm, les than 200 ppm, and less than 180 ppm contamination. Heating at 100° C. for 4 hours (Example 13) has only 140 ppm contamination. Likewise, heating at 350° C. (Examples 17-18) comprised less than 100 ppm and less than 70 ppm contamination. Examples 17-18 had less residual contamination than any of Examples 1-12 and Comparative Examples DD-OO. Indeed Examples 13 and 18 had about 50 wt % or less of the contamination in Comparative Examples JJ and OO, respectively, which is attributed to the hydrogen peroxide in Examples 13 and 18. The additional peroxide-containing aqueous solution in Examples 13-18 (compared to Examples 7-12) suggests that increasing the amount of the peroxide-containing aqueous solution can increase the amount of contamination removed.

The present disclosure provides methods of cleaning glass, which removes contamination from the glass to enable the glass to be recycled and/or components of the glass to be recovered (i.e., extracted). Methods comprise mixing the contaminated glass with a peroxide-containing aqueous solution. Providing a peroxide-containing aqueous solution can act as an oxidizer to facilitate the removal of organic contaminants from the glass. Providing a concentration of the peroxide-containing compound in the peroxide-containing aqueous solution of about 5 wt % or more (e.g., 8 wt % or more, 10 wt % or more) can enable full oxidation of organic contamination of the glass even when relatively small amounts (e.g., 50 wt % or less, 20 wt % or less) of the peroxide-containing aqueous solution are mixed with the glass. In aspects, providing a relatively small amount (e.g., 50 wt % or less, 20 wt % or less) of the peroxide-containing aqueous solution can reduce an amount of energy required to remove the peroxide-containing aqueous solution from the glass. Alternatively, providing a relatively large amount (e.g., 50 wt % or more, 100 wt % or less) of the peroxide-containing aqueous solution can enable inorganic contaminants and/or organic contaminants (e.g., oxidized by the peroxide-containing material and/or solubilized by the optional surfactant). In aspects, providing a surfactant can enable the peroxide-containing aqueous solution to solubilize contamination (e.g., inorganic contamination, oil-soluble organic contamination), for example, that can be separated from the glass and/or washed away. In aspects, mixing the glass in an oxygen-containing environment can facilitate oxidation of organic contaminants on the glass. Mixing the powder and the peroxide-containing aqueous solution at a relatively low temperature (e.g., less than 70° C., about 50° C. or less, about 40° C. or less) can reduce an amount of energy and cost associated with cleaning the glass. Providing 10 minutes or more after the adding the peroxide-containing aqueous solution to the glass before heating the glass can enable the peroxide-containing aqueous solution to react with (e.g., oxidize) organic contaminants on the glass. In aspects, removing the peroxide-containing aqueous solution from the glass before heating the glass can reduce an amount of energy used in the method and/or remove at least a portion of contaminants (e.g., organic contaminants, inorganic contaminants). In aspects, the contaminated glass can be provided as a powder (e.g., with a median particle size from about 1 μm to about 1 mm), which can increase a surface area of the glass to enable the peroxide-containing aqueous solution to oxide organic contamination, enable the glass to more easily be mixed with the peroxide-containing aqueous solution, and/or increase a packing efficiency of the glass to reduce an amount of space required to clean the glass.

Heating at a temperature of 350° C. or less (e.g., 280° C. or less, or 250° C. or less) can reduce the energy used to clean the glass. Heating at a temperature of 100° C. or more can remove the peroxide-containing aqueous solution and enable the oxidation and volatilization of organic contaminants on the glass treated with the peroxide-containing aqueous solution. Methods can remove greater than 90 wt % of an amount of organic contaminants in the glass based on an initial amount of organic contaminants initially present in the glass. Without wishing to be bound by theory, methods can oxidize organic contaminants that enables the organic contaminants to be removed more completely than heating alone. For example, as indicated in the Example discussed herein, an amount of organic contamination remaining (e.g., carbon), as a percentage of an amount of organic contamination for glass subject to the same heating conditions but without the mixing, can be about 33 wt % or less (i.e., at least 3 times more effective), about 25 wt % or less (i.e., at least 4 times more effective), about 20 wt % or less (i.e., at least 5 times more effective), about 16 wt % or less (i.e., at least 6 times more effective), about 14 wt % or less (i.e., at least 7 times more effective), about 12 wt % or less (i.e., at least 8 times more effective), about 11 wt % or less (i.e., at least 9 times more effective), or about 10 wt % or less (i.e., at least 10 times more effective). In aspects, an amount of organic contamination remaining (e.g., carbon) after the method of the present disclosure, based on the amount of glass, can be about 1000 parts-per-million (ppm) or less, about 750 ppm or less, about 500 ppm or less, about 300 ppm or less, about 200 ppm or less, or about 100 ppm or less.

Directional terms as used herein—for example, up, down, right, left, front, back, top, bottom—are made only with reference to the figures as drawn and are not intended to imply absolute orientation.

It will be appreciated that the various disclosed aspects may involve features, elements, or steps that are described in connection with that aspect. It will also be appreciated that a feature, element, or step, although described in relation to one aspect, may be interchanged or combined with alternate aspects in various non-illustrated combinations or permutations.

It is also to be understood that, as used herein the terms "the," "a," or "an," mean "at least one," and should not be limited to "only one" unless explicitly indicated to the contrary. For example, reference to "a component" comprises aspects having two or more such components unless the context clearly indicates otherwise. Likewise, a "plurality" is intended to denote "more than one."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Ranges can be expressed herein as from "about" one particular value, and/or to "about" another particular value. When such a range is expressed, aspects include from the one particular value and/or to the other particular value. Similarly, when values are expressed as approximations, by use of the antecedent "about," it will be understood that the particular value forms another aspect. Whether or not a numerical value or endpoint of a range in the specification recites "about," the numerical value or endpoint of a range is intended to include two aspects: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In aspects, "substantially similar" may denote values within about 10% of each other, for example, within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

While various features, elements, or steps of particular aspects may be disclosed using the transitional phrase "comprising," it is to be understood that alternative aspects, including those that may be described using the transitional phrases "consisting of" or "consisting essentially of," are implied. Thus, for example, implied alternative aspects to an apparatus that comprises A+B+C include aspects where an apparatus consists of A+B+C and aspects where an apparatus consists essentially of A+B+C. As used herein, the terms "comprising" and "including", and variations thereof shall be construed as synonymous and open-ended unless otherwise indicated.

The above aspects, and the features of those aspects, are exemplary and can be provided alone or in any combination with any one or more features of other aspects provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of the aspects herein provided they come within the scope of the appended claims and their equivalents.

What is claimed is:

1. A method of cleaning glass comprising:
    cleaning the glass by mixing the glass with 50 wt % or more of a peroxide-containing aqueous solution based on an amount of the glass for a period of time, wherein the glass comprises a powder comprising a median particle size from about 1 micrometer to about 1 millimeter;
    removing the peroxide-containing aqueous solution from the glass; and then
    heating the glass at a temperature of about 100° C. or more.

2. The method of claim 1, wherein the peroxide-containing aqueous solution comprises from about 5 wt % to about 30 wt % of hydrogen peroxide based on an amount of the peroxide-containing aqueous solution.

3. The method of claim 1, wherein the mixing occurs in an oxygen-containing environment containing greater than 25 vol % oxygen.

4. The method of claim 1, wherein the period of time for the mixing is from about 10 minutes to about 8 hours.

5. The method of claim 1, wherein the removing comprises applying a vacuum to the mix of glass and peroxide-containing aqueous solution.

6. The method of claim 1, wherein the removing comprises using filtration of the mix of glass and peroxide-containing aqueous solution.

7. The method of claim 1, further comprising, after the removing the peroxide-containing aqueous solution and before the heating:
    rinsing the glass with deionized water; and
    removing the deionized water from the rinsed glass by applying a vacuum, using filtration, or a combination thereof.

8. The method of claim 1, wherein the mixing occurs at a temperature less than 70° C.

9. The method of claim 1, wherein the heating the glass comprising heating at the temperature from about 100° C. to about 350° C. for from about 1 hour to about 8 hours.

10. The method of claim 1, wherein, after the heating, the glass comprises less than 1000 ppm carbon.

11. The method of claim 1, wherein, using water instead of the peroxide-containing aqueous solution produces glass with 10% or more carbon than using the peroxide-containing aqueous solution.

12. The method of claim 2, wherein the peroxide-containing aqueous solution comprises from about 0.1 wt % to about 5 wt % of a surfactant based on the amount of the peroxide-containing aqueous solution.

13. A method of cleaning glass comprising:
    cleaning the glass by mixing the glass with from 10 wt % to 50 wt % of a peroxide-containing aqueous solution based on an amount of the glass for a period of time, wherein the glass comprises a powder comprising a median particle size from about 1 micrometer to about 1 millimeter; and then
    heating the glass at a temperature of about 100° C. or more.

14. The method of claim 13, wherein the peroxide-containing aqueous solution comprises from about 5 wt % to about 30 wt % of hydrogen peroxide based on an amount of the peroxide-containing aqueous solution.

15. The method of claim 13, wherein the mixing occurs for the period of time from about 10 minutes to about 4 hours at a temperature less than 70° C.

16. The method of claim 13, wherein the heating occurs at the temperature from about 100° C. to about 350° C. for from about 1 hour to about 4 hours.

17. The method of claim 13, wherein, after the heating, the glass comprises less than 1000 ppm carbon.

* * * * *